US012700258B2

(12) United States Patent
Kvitnitsky

(10) Patent No.: US 12,700,258 B2
(45) Date of Patent: Aug. 4, 2026

(54) SYSTEMS AND METHODS FOR RECOGNITION OF POLITICALLY EXPOSED PERSONS

(71) Applicant: Anatoly Kvitnitsky, Alameda, CA (US)

(72) Inventor: Anatoly Kvitnitsky, Alameda, CA (US)

( * ) Notice: Subject to any disclaimer, the term of this patent is extended or adjusted under 35 U.S.C. 154(b) by 185 days.

(21) Appl. No.: 18/499,089

(22) Filed: Oct. 31, 2023

(65) Prior Publication Data

US 2025/0140019 A1     May 1, 2025

(51) Int. Cl.
*G06V 40/16* (2022.01)
*G06F 16/955* (2019.01)

(52) U.S. Cl.
CPC ........ *G06V 40/172* (2022.01); *G06F 16/9566* (2019.01); *G06V 40/161* (2022.01)

(58) Field of Classification Search
CPC . G06F 16/9566; G06V 40/161; G06V 40/172
See application file for complete search history.

(56) References Cited

U.S. PATENT DOCUMENTS

| | | | | |
|---|---|---|---|---|
| 8,069,126 B2 * | 11/2011 | Schiffer | ................. | G06Q 10/06 |
| | | | | 706/12 |
| 8,706,614 B2 * | 4/2014 | Lawrence | .......... | G06Q 20/4016 |
| | | | | 705/38 |
| 2018/0181625 A1 * | 6/2018 | Lyons | ................ | G06Q 30/0201 |

FOREIGN PATENT DOCUMENTS

DE        212019000019 U1 *  9/2019  ............... G07C 9/27

* cited by examiner

*Primary Examiner* — Ruiping Li
(74) *Attorney, Agent, or Firm* — Sam Pierce

(57)        ABSTRACT
According to an aspect of the present invention, there is provided a computer-implemented method of identifying a Politically Exposed Person and sending a prediction of whether the photograph of the potential customer is a particular Politically Exposed Person to a client. According to another aspect of the present invention, there is provided a system for identifying a Politically Exposed Person, comprising: a computer-readable medium; a client server; and one or more processors configured for training a machine learning model to detect faces in the images associated with the one or more identifies of government officials.

11 Claims, 1 Drawing Sheet

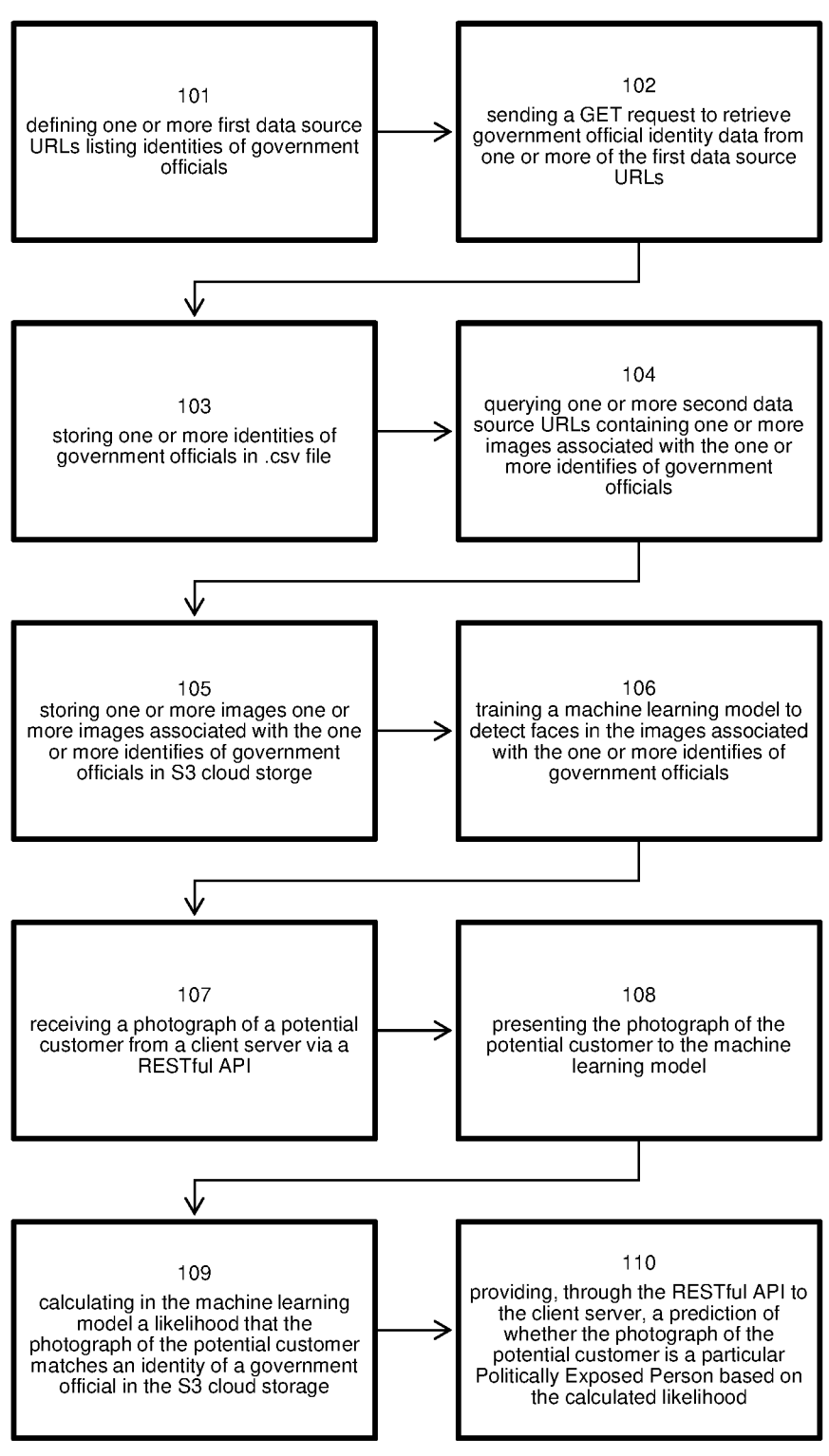

101
defining one or more first data source URLs listing identities of government officials 102
sending a GET request to retrieve government official identity data from one or more of the first data source URLs 103
storing one or more identities of government officials in .csv file 104
querying one or more second data source URLs containing one or more images associated with the one or more identifies of government officials 105
storing one or more images one or more images associated with the one or more identifies of government officials in S3 cloud storge 106
training a machine learning model to detect faces in the images associated with the one or more identifies of government officials 107
receiving a photograph of a potential customer from a client server via a RESTful API 108
presenting the photograph of the potential customer to the machine learning model 109
calculating in the machine learning model a likelihood that the photograph of the potential customer matches an identity of a government official in the S3 cloud storage 110
providing, through the RESTful API to the client server, a prediction of whether the photograph of the potential customer is a particular Politically Exposed Person based on the calculated likelihood

SYSTEMS AND METHODS FOR RECOGNITION OF POLITICALLY EXPOSED PERSONS

BACKGROUND

Computerized systems and methods for banks and non-bank financial institutions to manage risks associated with maintaining investment accounts for politically exposed persons (PEPs) have been described in the prior art patent literature.

For example, U.S. Pat. No. 8,706,614 discloses a computer-implemented method to facilitate management of risk related to political exposure associated with a financial transaction which may comprise receiving financial transaction data associated with the transaction, determining that the participant is a politically identified person, calculating a first category political risk score based on the financial transaction data, calculating a second category political risk score based on the financial transaction data, calculating an overall transaction political risk quotient associated with the financial transaction based on the first and second category politically risk scores, generating a suggested action for the financial transaction based on the overall transaction political risk quotient, and delivering the matching name and a suggested action to a user interface in a format based on a user preference and a user device configuration.

U.S. Pat. No. 8,069,126 discloses a method for ranking politically exposed persons and/or other persons and entities that pose a heightened risk based on their importance wherein an exposure index is determined for each person in the population as a function of the existence or absence of a relationship with each of the other members of the population and each of one or more exposure factors such as position held by the person, country in which the position is held, and source of information about the person. The politically exposed persons in the population are ranked in accordance with their respective exposure indexes. The population is sorted and a subset of the population containing those politically exposed persons having exposure indexes indicative or the highest likelihood of illicit financial activity is thereby identified.

Nevertheless, prior art solutions are lacking at least in terms of precision and breadth, and financial institution personnel still have inadequate resources available to assist them with the identification of PEPs.

SUMMARY OF INVENTION

Therefore, the present invention provides technological solutions for systems and methods for recognition of politically exposed persons. Financial institutions may find these systems and methods particularly useful, but the systems and methods are not limited to only this use and may find broad application elsewhere as well.

According to an aspect of the present invention, there is provided computer-implemented method of identifying a Politically Exposed Person, comprising: defining one or more data source URLs listing identities of government officials; sending a GET request to retrieve government official identity data from one or more of the first data source URLs; storing one or more identities of government officials in a .csv file; querying one or more second data source URLs containing one or more images associated with the one or more identifies of government officials; storing one or more images one or more images associated with the one or more identifies of government officials in S3 cloud storage; training a machine learning model to detect faces in the images associated with the one or more identifies of government officials; receiving a photograph of a potential customer from a client server via a RESTful API; presenting the photograph of the potential customer to the machine learning model; calculating in the machine learning model a likelihood that the photograph of the potential customer matches an identity of a government official in the S3 cloud storage; and providing, through the RESTful API to the client server, a prediction of whether the photograph of the potential customer is a particular Politically Exposed Person based on the calculated likelihood.

According to another aspect of the present invention, there is provided a system for identifying a Politically Exposed Person, comprising: a computer-readable medium; and one or more processors configured for: defining one or more first data source URLs listing identities of government officials; sending a GET request to retrieve government official identity data from one or more of the first data source URLs; storing one or more identities of government officials in a .csv file; querying one or more second data source URLs containing one or more images associated with the one or more identifies of government officials; storing one or more images one or more images associated with the one or more identifies of government officials in S3 cloud storage; training a machine learning model to detect faces in the images associated with the one or more identifies of government officials; receiving a photograph of a potential customer from a client server via a RESTful API; presenting the photograph of the potential customer to the machine learning model; calculating in the machine learning model a likelihood that the photograph of the potential customer matches an identity of a government official in the S3 cloud storage; and providing, through the RESTful API to the client server, a prediction of whether the photograph of the potential customer is a particular Politically Exposed Person based on the calculated likelihood.

BRIEF DESCRIPTION OF THE DRAWINGS

FIG. 1 is a flow chart according to a process in an embodiment.

DETAILED DESCRIPTION

The following refers to the steps depicted in FIG. 1.

Step 101 is defining one or more first data source URLs listing identities of government officials.

Step 102 is sending a GET request to retrieve government official identity data from one or more of the first data source URLs.

Step 103 is storing one or more identities of government officials in a .csv file.

Step 104 is querying one or more second data source URLs containing one or more images associated with the one or more identifies of government officials.

Step 105 is storing one or more images one or more images associated with the one or more identifies of government officials in S3 cloud storage.

Step 106 is training a machine learning model to detect faces in the images associated with the one or more identifies of government officials.

Step 107 is receiving a photograph of a potential customer from a client server via a RESTful API.

Step 108 is presenting the photograph of the potential customer to the machine learning model.

Step 109 is calculating in the machine learning model a likelihood that the photograph of the potential customer matches an identity of a government official in the S3 cloud storage.

Step 110 is providing, through the RESTful API to the client server, a prediction of whether the photograph of the potential customer is a particular Politically Exposed Person based on the calculated likelihood.

The following are just a few examples of the many potential sources for data regarding PEPs:

Canada legislature

CIA's world fact book since 2003

US DOS's list of foreign diplomats in the US

US DOS's list of American diplomats overseas and their spouses

IPU (Inter-Parliamentary Union)-list of Parliament heads and secretaries

List of state and federal legislators, their spouses, aids and assistants

UK Parliament members

Open sanctions: https://www.opensanctions.org/datasets/peps/

Sourcing data from all of the sources in embodiments can involve extracting information from webpages and transferring it to an XLS, CSV, or JSON file.

Embodiments may use a REST API, which is a type of application programming interface (API) that complies with the representational state transfer (REST) model of data representation and communication between two systems (a client and server) over a network such as the Internet. Alternatives to REST in some embodiments include GraphQL, gRPC, WebSockets, MQTT, Event-Driven Architecture (EDA), FALCOR, and Functions.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. FIGURES are also merely representational and may not be drawn to scale. Similar numerals designate similar elements among the several FIGURES. Certain proportions thereof may be exaggerated, while others may be minimized. Accordingly, the specification and drawings are to be regarded in an illustrative rather than a restrictive sense. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description. Therefore, it is intended that the disclosure not be limited to the particular embodiment(s) disclosed.

What is claimed is:

1. A computer-implemented method of identifying a Politically Exposed Person, comprising:

defining one or more data source URLs listing identities of government officials;

sending a GET request to retrieve government official identity data from one or more of the first data source URLs;

storing one or more identities of government officials in a .csv file;

querying one or more second data source URLs containing one or more images associated with the one or more identifies of government officials;

storing one or more images associated with the one or more identifies of government officials in S3 cloud storage;

training a machine learning model to detect faces in the images associated with the one or more identifies of government officials;

receiving a photograph of a potential customer from a client server via a RESTful API;

presenting the photograph of the potential customer to the machine learning model;

calculating in the machine learning model a likelihood that the photograph of the potential customer matches an identity of a government official in the S3 cloud storage; and providing, through the RESTful API to the client server, a prediction of whether the photograph of the potential customer is a particular Politically Exposed Person based on the calculated likelihood.

2. The method of claim 1, wherein the photograph of the potential customer is a photograph contained on an identification document.

3. The method of claim 2, wherein the identification document is a passport.

4. The method of claim 2, wherein the identification document is a driver's license.

5. The method of claim 1, further comprising providing a dossier with the prediction.

6. The method of claim 1, further comprising determining if one or more second data source URLs containing one or more images associated with the one or more identifies of government officials has been created by using generative AI.

7. A system for identifying a Politically Exposed Person, comprising:

a computer-readable medium;

a client server; and one or more processors configured for:

defining one or more first data source URLs listing identities of government officials;

sending a GET request to retrieve government official identity data from one or more of the first data source URLs;

storing one or more identities of government officials in a .csv file;

querying one or more second data source URLs containing one or more images associated with the one or more identifies of government officials;

storing one or more images associated with the one or more identifies of government officials in S3 cloud storage;

training a machine learning model to detect faces in the images associated with the one or more identifies of government officials;

receiving a photograph of a potential customer from the client server via a RESTful API;

presenting the photograph of the potential customer to the machine learning model;

calculating in the machine learning model a likelihood that the photograph of the potential customer matches an identity of a government official in the S3 cloud storage; and providing, through the RESTful API to the client server, a prediction of whether the photograph of the potential customer is a particular Politically Exposed Person based on the calculated likelihood.

8. The system for identifying a Politically Exposed Person of claim 7, further comprising an input/output device communicatively connected to the client server.

9. The system for identifying a Politically Exposed Person of claim 8, wherein the photograph of the potential customer is received from the input/output device.

10. The system for identifying a Politically Exposed Person of claim 7, further comprising a display device communicatively connected to the client server.

11. The system for identifying a Politically Exposed Person of claim 10, wherein the prediction is displayed on the display device.

* * * * *